(12) United States Patent
Åström et al.

(10) Patent No.: US 8,285,852 B2
(45) Date of Patent: Oct. 9, 2012

(54) METHOD AND APPARATUS FOR IDENTIFYING AN IMS SERVICE

(75) Inventors: Bo Åström, Stockholm (SE); Mats Stille, Bromma (SE); Anders Ryde, Saltsjöbaden (SE); Stephen Terrill, Madrid (ES); Bror Lennart Norell, Älvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 735 days.

(21) Appl. No.: 11/914,796

(22) PCT Filed: May 25, 2005

(86) PCT No.: PCT/EP2005/052402
§ 371 (c)(1),
(2), (4) Date: Jan. 9, 2008

(87) PCT Pub. No.: WO2006/125471
PCT Pub. Date: Nov. 30, 2006

(65) Prior Publication Data
US 2009/0144429 A1 Jun. 4, 2009

(51) Int. Cl.
*H04L 12/66* (2006.01)
*G06F 15/16* (2006.01)

(52) U.S. Cl. ........................ 709/227; 370/352

(58) Field of Classification Search .............. 709/206, 709/230, 227; 455/412.1; 370/352–356, 370/401
See application file for complete search history.

(56) References Cited

U.S. PATENT DOCUMENTS

| | | | |
|---|---|---|---|
| 2003/0009565 A1 | 1/2003 | Arao | |
| 2004/0186918 A1 | 9/2004 | Lonnfors et al. | |
| 2004/0213150 A1* | 10/2004 | Krause et al. | 370/229 |
| 2004/0223489 A1* | 11/2004 | Rotsten et al. | 370/352 |
| 2004/0243680 A1* | 12/2004 | Mayer | 709/206 |
| 2004/0259532 A1* | 12/2004 | Isomaki et al. | 455/412.1 |
| 2005/0237952 A1* | 10/2005 | Punj et al. | 370/260 |
| 2006/0047840 A1* | 3/2006 | Postmus | 709/230 |
| 2006/0092269 A1* | 5/2006 | Baird et al. | 348/14.08 |
| 2006/0153352 A1* | 7/2006 | Schmidt et al. | 379/202.01 |
| 2008/0086564 A1* | 4/2008 | Putman et al. | 709/227 |

FOREIGN PATENT DOCUMENTS

| | | |
|---|---|---|
| WO | WO 03/056732 A1 | 7/2003 |
| WO | WO 2004/107250 A | 12/2004 |
| WO | WO 2005/027460 A1 | 3/2005 |

OTHER PUBLICATIONS

Comneon, Ericsson, Motorola, Nokia. Siemens-Signaling Flows (UNI) V 2.0.6 : "Push-To-Talk over Cellular ( PoC): Signaling Flows-UE to Network Interface (UNI); PoC Release 2.0" Internet Article, 'Online! Jun. 2004. pp. 1-133, XP002355185 Retrieved from the Internet: URL:http://www.motorola.com/mot/doc/1/1571__MotDoc.pdf>'retrieved on Nov. 21, 2005! p. 21.

(Continued)

*Primary Examiner* — Ian N Moore
*Assistant Examiner* — Thai Nguyen

(57) ABSTRACT

An apparatus and method for indicating the IP Multimedia Subsystem (IMS) services to which a Session Initiation Protocol (SIP) message relates. One or more communication service identifiers are added to the SIP message as a Feature Tag.

9 Claims, 10 Drawing Sheets

OTHER PUBLICATIONS

"3rd Generation Partnership Project; Technical Specification Group Services and System Aspects: Support of Push service (Release 5): 3GPP TR 23.875" ETSI Standards, European Telecommunications Standards Institute, Sophia-Antipo, FR, No. V510, Mar. 2002, XP014021954 ISSN: 0000-0001 section 7.6.1: IM Subsystem Scenario.

Rosenberg Dynamicsoft H. Schulzrinne Columbia University P. Kyzivat Cisco Systems J: "Indicating User Agent Capabilities in the Session Initiation Protocol SIP" IETF Standard, Internet Engineering Task Force, IETF, CH Aug. 2004. XP015009618 p. 3-p. 26.

ITU-T Q 1231. Introduction to Intelligent Network Capability Set 3. International Telecommunication Union ITU-T Recommendation Q1231 Dec. 1999.

Wang, Zheng. Development of Intelligent Network. Jul. 24, 2002, Abstract.

Terrill, Stephen, Ericsson. IMS Communication Service Identifier (ServID). 3GPP TSG-SA WG2 #46, S2-050992. May 9, 2005. Athens, Greece.

* cited by examiner

INVITE sip: SIP-URI1@operator.com SIP/2.0
To: sip:S-CSCF@operator.com
Accept-Contact: audio; video; data; +g.communication service=p2p.multimedia
//SDP part
Content-Type: application/SDP
Content-Disposition: session v=0
o=PUI1 56773860 7089898 IN IP4 192.0.0.2
s=-
c= IP4 192.0.0.2
t=0
m=audio 20000 RTP/AVP 0
a= sendrecv

Figure 4

REGISTER sip:operator.com SIP/2.0
To: sip:S-CSCF@operator.com
Contact: <sip:SIP-URI1@operator.com>;
  ;methods="INVITE,BYE,OPTIONS,ACK,CANCEL, MESSAGE"
  ;uri-user="< SIP-URI1 >"
  ;audio
  ;video
  ;data   (for text, picture, whiteboard, application sharing, game, etc.)
  ;schemes="sip,tel"
  ⎫ Base Feature Tags as per RFC 3840

;+g.communication service=p2p.multimedia
  ;+g.communication service=poc.talkburst
  ;+g.communication service=deferred multimedia messaging
  ⎫ Feature Tags for supported Communication Services ;+g.application-references=poc.talkburst, p2p.multimedia,
       3gpp.VideoSharing, Ericsson.WeShare.WB
  ⎫ Feature Tags for supported Application References

*Figure 7*

INVITE sip: SIP-URI1@operator.com SIP/2.0
To: sip:S-CSCF@operator.com
Accept-Contact: audio; video; data;
; +g.communication service Id=p2p.multimedia
; +g.application-ref=operator-specific-multimedia-player
//SDP part
Content-Type: application/SDP
Content-Disposition: session v=0
o=PUI1 56773860 7089898 IN IP4 192.0.0.2
s=-
c= IP4 192.0.0.2
t=0
m=video 20000 RTP/AVP 0
a= 3gpp.VideoSharing
a= sendrecv

Figure 8

```
INVITE sip: SIP-URI1@operator.com SIP/2.0
To: sip:S-CSCF@operator.com
Accept-Contact: audio; video; data;
; +g.communication service Id=p2p.multimedia
; +g.application-ref=OperatorOfficeHelper Required
; +g.mcs-qualifier= p2p.multimedia, "SIP Session Call-Id-value"
; +g.mcs-qualifier= CS-Speech, MSISDN
//SDP part
Content-Type: application/SDP
Content-Disposition: session v=0
o=PUI1 56773860 7089898 IN IP4 192.0.0.2
s=-
c= IP4 192.0.0.2
t=0
m=video 20000 RTP/AVP 0
a= 3gpp.VideoHelper
a= sendrecv
```

Figure 10

MESSAGE sip: SIP-URI1@operator.com SIP/2.0
To: sip:S-CSCF@operator.com
Accept-Contact:
; +g.communication service id= ims.messaging
; +g.application-ref=VodafoneOfficeHelper Required
; +g. mcs-qualifier= p2p.multimedia, "SIP Session Call-id"
; +g. mcs-qualifier= CS-Speech, MSISDN
; +g. mcs-qualifier= ims.messaging

Figure 11

METHOD AND APPARATUS FOR IDENTIFYING AN IMS SERVICE

FIELD OF THE INVENTION

The present invention relates to a method and apparatus for identifying an IP Multimedia Subsystem (IMS) service, and in particular for identifying an IMS service to which an IMS communication or communication request relates.

BACKGROUND TO THE INVENTION

IP Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalized, rich multimedia communication services, including so-called "combinational IP Multimedia" services which are considered in more detail below.

IP Multimedia Subsystem (IMS) is the technology defined by the Third Generation Partnership Project (3GPP) to provide IP Multimedia services over mobile communication networks (3GPP TS 22.228, TS 23.228, TS 24.229, TS 29.228, TS 29.229, TS 29.328 and TS 29.329 Release 5 and Release 6). IMS provides key features to enrich the end-user person-to-person communication experience through the use of standardized IMS Service Enablers, which facilitate new rich person-to-person (client-to-client) communication services as well as person-to-content (client-to-server) services over IP-based networks. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly.

FIG. 1 illustrates schematically how the IMS fits into the mobile network architecture in the case of a GPRS/PS access network. Call/Session Control Functions (CSCFs) operate as SIP proxies with the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

A user registers with the IMS using the specified SIP REGISTER method. This is a mechanism for attaching to the IMS and announcing to the IMS the address at which a SIP user identity can be reached. In 3GPP, when a SIP terminal performs a registration, the IMS authenticates the user, and allocates a S-CSCF to that user from the set of available S-CSCFs. Whilst the criteria for allocating S-CSCFs is not specified by 3GPP, these may include load sharing and service requirements. It is noted that the allocation of an S-CSCF is key to controlling (and charging for) user access to IMS-based services. Operators may provide a mechanism for preventing direct user-to-user SIP sessions which would otherwise bypass the S-CSCF.

During the registration process, it is the responsibility of the I-CSCF to select an S-CSCF if a S-CSCF is not already selected. The I-CSCF receives the required S-CSCF capabilities from the home network's Home Subscriber Server (HSS), and selects an appropriate S-CSCF based on the received capabilities. [It is noted that S-CSCF allocation is also carried for a user by the I-CSCF in the case where the user is called by another party, and the user is not currently allocated an S-CSCF.] When a registered user subsequently sends a session request to the IMS, the P-CSCF is able to forward the request to the selected S-CSCF based on information received from the S-CSCF during the registration process.

Within the IMS service network, Application Servers (ASs) are provided for implementing IMS service functionality. Application Servers provide services to end-users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Applications Servers that should be "linked in" during a SIP Session establishment. The IFCs are received by the S-CSCF from an HSS during the IMS registration procedure as part of a user's User Profile.

FIG. 2 illustrates the IMS Service Control (ISC) interface between an AS and an S-CSCF, as well as other interfaces within the IMS. Although the AS in FIG. 2 is shown as having only a single interface to an S-CSCF, it will be appreciated that in practice the ISC interface will extend across a communication network to which many (or all) of the CSCF servers of a given operator's network are connected, allowing an AS to communicate with all of these CSCFs. [Other entities illustrated in FIG. 1 will be well known to those of skill in the art.]

A further interface (Ut) exists between the AS and the user terminal (TS23.002) although this is not shown in the Figure. The Ut interface enables the user to manage information related to his or her services, e.g. creation and assignment of Public Service Identities, management of authorization policies that are used for example by "presence" services, conference policy management, etc.

SUMMARY OF THE INVENTION

As far as IMS services are required, different communication services are likely to require different handling by the IMS and by user terminals. More particularly:

Different services may require the "linking-in" of different application servers over the ISC interface;

Sessions may be routed to different end user terminals that a given user has registered with the IMS, in dependence upon the service to which the session relates (matching terminal capabilities to service type can be used, for example, to avoid forking);

Different the functional entities in a recipient's terminal may be designated to handle different services (e.g. PoC and P2P Multimedia);

Network operators may have different levels of authorization for different services;

Different correct media authorization policies may be applied to different services. For example, voice (audio) in PoC does not require the same Quality of Service support in the network as P2P multimedia, and therefore media will be allocated accordingly.

A network operator may apply different charging rules depending upon the IMS service;

Service interworking requirements (e.g. IMS deferred messaging—MMS) may depend upon the IMS service.

The Session Description Protocol (SDP) of SIP specifies a so-called "m-line" field that defines the initial type of media to be used for an IMS service. For example, the m-line may specify "audio 20000 RTP/AVP 0" or "video 20000 RTP/AVP 0". [The m-line format is defined in the IETF RFC (2327). "20000" is the port number that shall be used and RTP is the protocol. AVPs are defined for different protocols and the values assigned for AVPs have different meanings depending upon the protocols. A certain value can for example express which codec that shall be used.] It has been envisaged that the m-line information can be used to identify the IMS communication service type. However, the success of IMS has meant that there will be a number of different communication services using the same media type. For example, both PoC and person-to-person multimedia might make use of the "audio" media type. The m-line information cannot therefore be used to uniquely identify the IMS communication service. This problem has been identified by the inventors of the present invention in a 3GPP work item titled "IMS Communication Service Identifier (ServID)".

According to a first aspect of the present invention there is provided a method of indicating the IP Multimedia Subsystem communication service(s) to which a Session Initiation Protocol message relates, the method comprising including one or more communication service identifier(s) in the Session Initiation Protocol message as a Feature Tag of the message, a communication service identifier identifying one of a plurality of communication services.

A SIP message may include one or more communication service identifiers as Feature Tags, e.g. in the case of a SIP REGISTER message.

The Feature Tag may be included in a Contact Header, Accept-Contact, or Reject-Contact header during Registration or as caller preferences during session establishment or message delivery for SIP messages that are not session based, e.g. SIP Message.

According to a second aspect of the present invention there is provided a method of identifying an application, residing at a user terminal, to which a Session Initiation Protocol message relates, the method comprising including an application reference in the Session Initiation Protocol message.

An application reference may be included in the SIP message header as a Feature Tag, e.g. in a Contact header in Register Messages, and Accept-Contact, or Reject-Contact headers in other SIP messages (e.g. INVITE). Alternatively, the application reference may be included as an "a-line", augmenting an "m-line" in an SDP part of the SIP message. Application references may be included both as a Feature Tag and as an a-line in the same SIP message, e.g. identifying a master application and an ancillary application respectively.

A preferred embodiment of the present invention combines the first and second aspects of the present invention. At a user terminal or IMS network node, the IMS stack identifies the appropriate communication service on the basis of a communication service identifier contained in a received Session Initiation Protocol message, and forwards the message to the functional (software) entity that implements this service. This functional entity is herein referred to as the communication service. The communication service that receives the message identifies the appropriate application on the basis of an application reference contained in the Session Initiation Protocol message, and forwards the message to that application.

According to a third aspect of the present invention there is provided a method allowing a plurality of Communication Services to be associated together within an IP Multimedia Subsystem or at a User Equipment, the method comprising identifying the or each associated service as a Feature Tag in the Session Initiation Protocol message.

For example, the invention may allow association of a plurality of simultaneous IMS communication services, e.g. P2P Multimedia with IMS Messaging, and/or to correlate IMS communication services with other simultaneous service sessions, e.g. Circuit Switched-Speech.

In a preferred embodiment of the invention, this third aspect is combined with one or both of the first and second aspect of the invention.

Other aspects of the invention include:
user terminals and network nodes comprising means for inserting into a Session Initiation Protocol message a communication service identifier as a Feature Tag of the message;
user terminals and network nodes comprising means for inserting into a Session Initiation Protocol message an application reference; and
user terminals and network nodes comprising means for inserting into a Session Initiation Protocol message.

According to still further aspects of the invention, one or more new SIP information Elements (parameters) may be standardized to carry one or more of the: Communication Service Identifier, Application Reference, and MCS-Qualifier (the Communication Service association identifier).

BRIEF DESCRIPTION OF THE DRAWINGS

FIG. 4 illustrates an example SIP INVITE message incorporating Communication Service Identifiers;

FIG. 7 illustrates an example SIP REGISTER message incorporating Communication Service Identifiers and Application References;

FIG. 8 illustrates an example SIP INVITE message incorporating Communication Service Identifiers and Application References;

FIG. 10 illustrates an example SIP INVITE message incorporating Communication Service Identifiers, Application References, and Multiple Communication Service Qualifiers; and FIG. 11 illustrates an example SIP Message incorporating Communication Service Identifiers, Application References, and Multiple Communication Service Qualifiers.

DETAILED DESCRIPTION OF CERTAIN EMBODIMENTS

There are a number of benefits from being able to identify the particular IP Multimedia Subsystem (IMS) service to which a Session Initiation Protocol (SIP) message relates. These have already been considered above. It is proposed here to facilitate this identification by including in the SIP message a "Communication Service Identifier", and in particular by including the Communication Service Identifier as a Feature Tag.

The appropriate Feature Tag is included in one of the Contact (Register), Accept-Contact, or Reject-Contact headers of the SIP message, as one of the "Caller Preferences". Examples of service identifiers are:
"+g.communication service=+g.p2p.multimedia"
"+g.communication service=+g.poc.talkburst"
"+g.communication service=+g.instant.messaging"
"+g.communication service=+g.deferred.multimedia.messaging"
where the suffix, e.g. "multimedia" identifies the IMS communication service.

Figure 1:
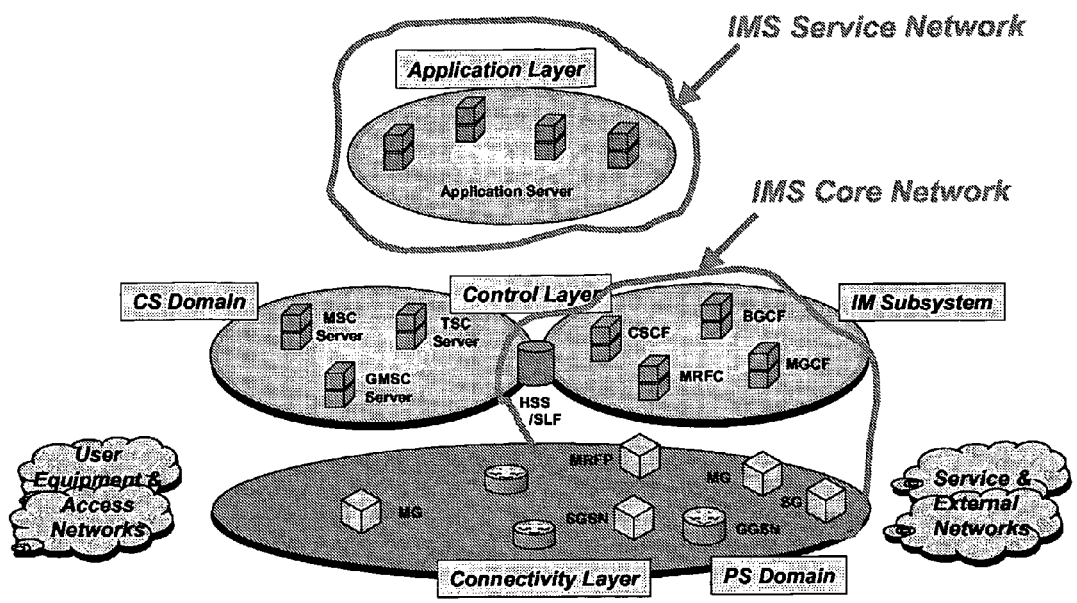
FIG. 1 illustrates schematically the integration of an IP Multimedia Subsystem into a 3G mobile communications system.
Figure 2:
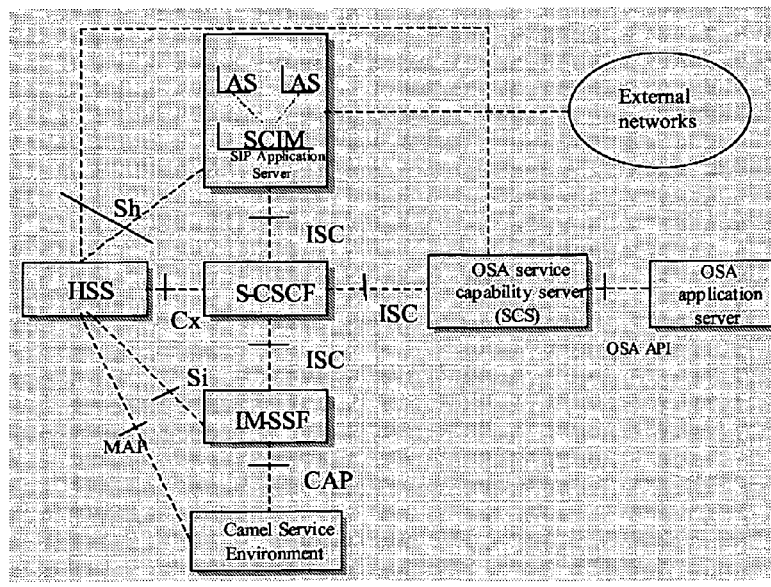
FIG. 2 illustrates schematically certain entities of the IP Multimedia Subsystem including an Application Server and a Serving Call/State Control Function.
Figure 3:
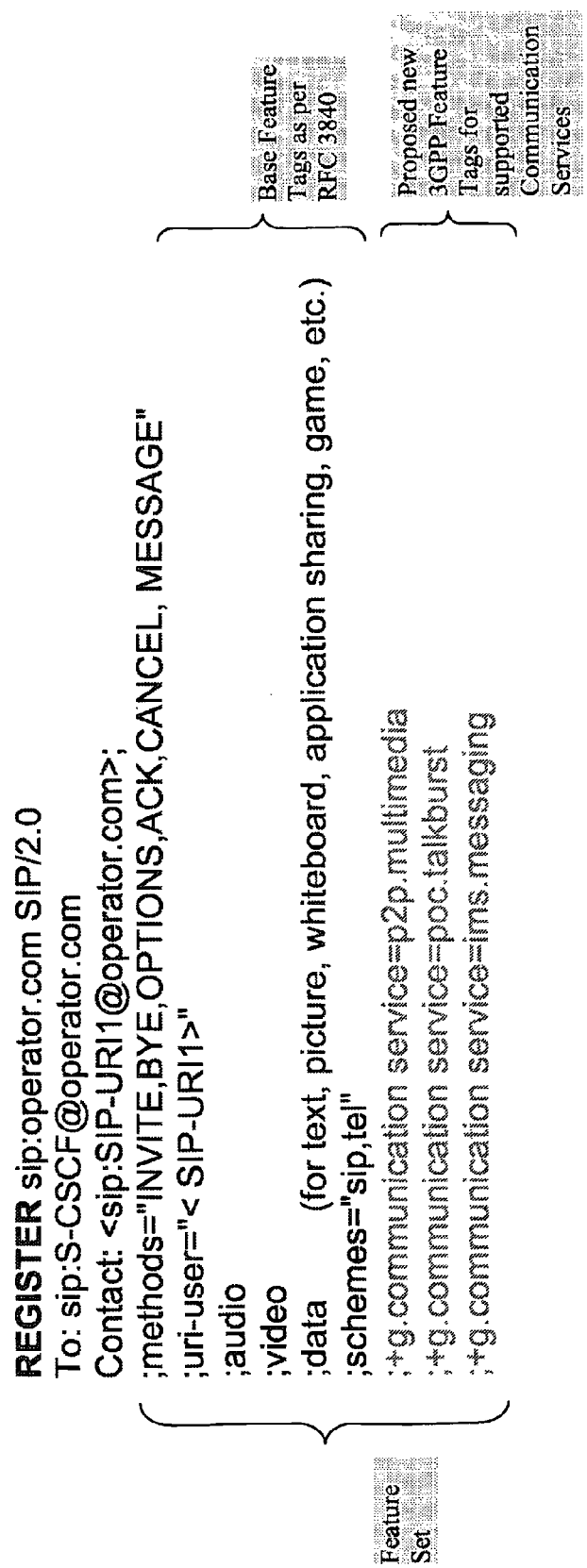
FIG. 3 illustrates an example SIP REGISTER message incorporating Communication Service Identifiers.

FIG. 3 shows the structure (in part) of a SIP REGISTER message which identifies the communication services that are supported by the message sender (User Equipment), by including Communication Service Identifiers in the Contact header. Feature Tags in Register Messages announce a terminal's capabilities to the network. The network (e.g. at the S-CSCF) can use this information to match caller preferences expressed by the originator of a SIP session with the recipient's set of registered terminals that best match the requested caller preferences. In the illustrated example, the supported services are: multimedia; talkburst; and multimedia messaging. Such a REGISTER message is sent by the UE to the Serving Call/Session Control Function (S-CSCF).

FIG. 4 shows the structure (in part) of a SIP INVITE message which is used to start a specific IMS communication service. The INVITE message identifies in the Accept-Contact header the media supported by the initiating UE, i.e. audio, video, data, as well as the service to which the message relates, i.e. person-to-person (p2P) multimedia. The "m-line" of the SDP message part indicates that initially the session is an audio only session. The other media, audio and data, identified in the Accept-Contact header are media that may be used in the session but are not used initially. The final recipient of this message is a peer UE, identified by the example "SIP URI SIP-URI1@operator.com". However, it is likely that the S-CSCF serving the initiating UE will examine the message, and may decide whether or not to forward the message depending upon the service identified by the Communication Service Identifier. If the subscriber is authorised to use the p2p multimedia service, the INVITE will be forwarded to the recipient UE (chosen, if necessary, on the basis of capabilities). Charging may also be initiated based upon the service, and or SIP ASs linked in to the SIP message path.

As an improvement to the approach described, the Communication Service Identifier in the Feature Tag may be supplemented with the version number of the related service.

Figure 5:
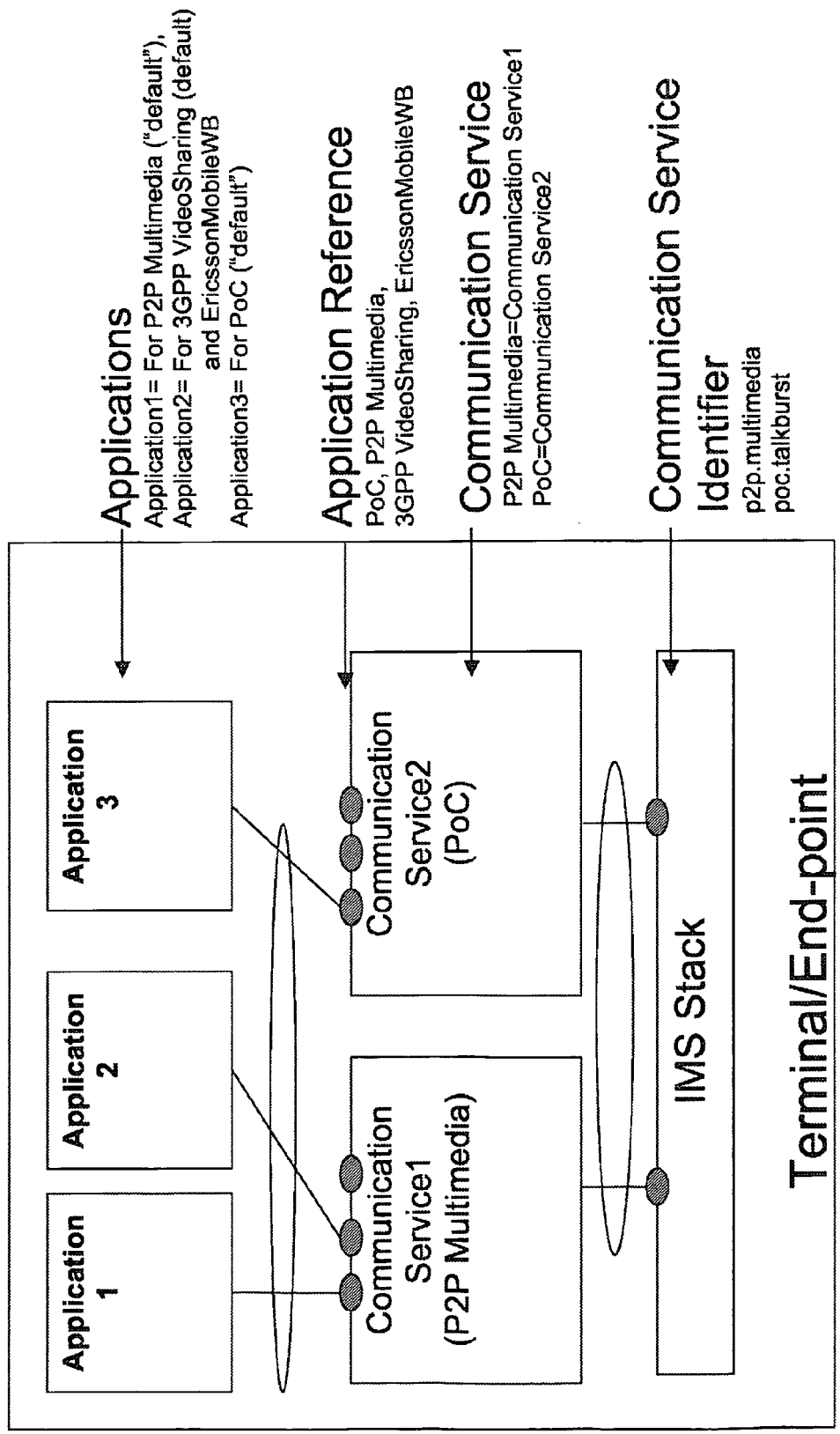
FIG. 5 illustrates schematically a UE architecture that makes use of Communication Service Identifiers and Application References.

In a typical UE, particular (standardized) communications services are likely to be handled by applications that in most cases will be provided "natively" by terminal vendors. These applications may conform to certain agreed standards and are referred to here as "default" applications for standardized IMS communication based service. Examples include default applications for handling p2p multimedia and PoC sessions. Other applications residing in the UEs may not be standardized, for example applications relating to games or company specific office applications. FIG. 5 illustrates the applications and communication services residing at a UE, on top of the IMS stack.

Figure 6:
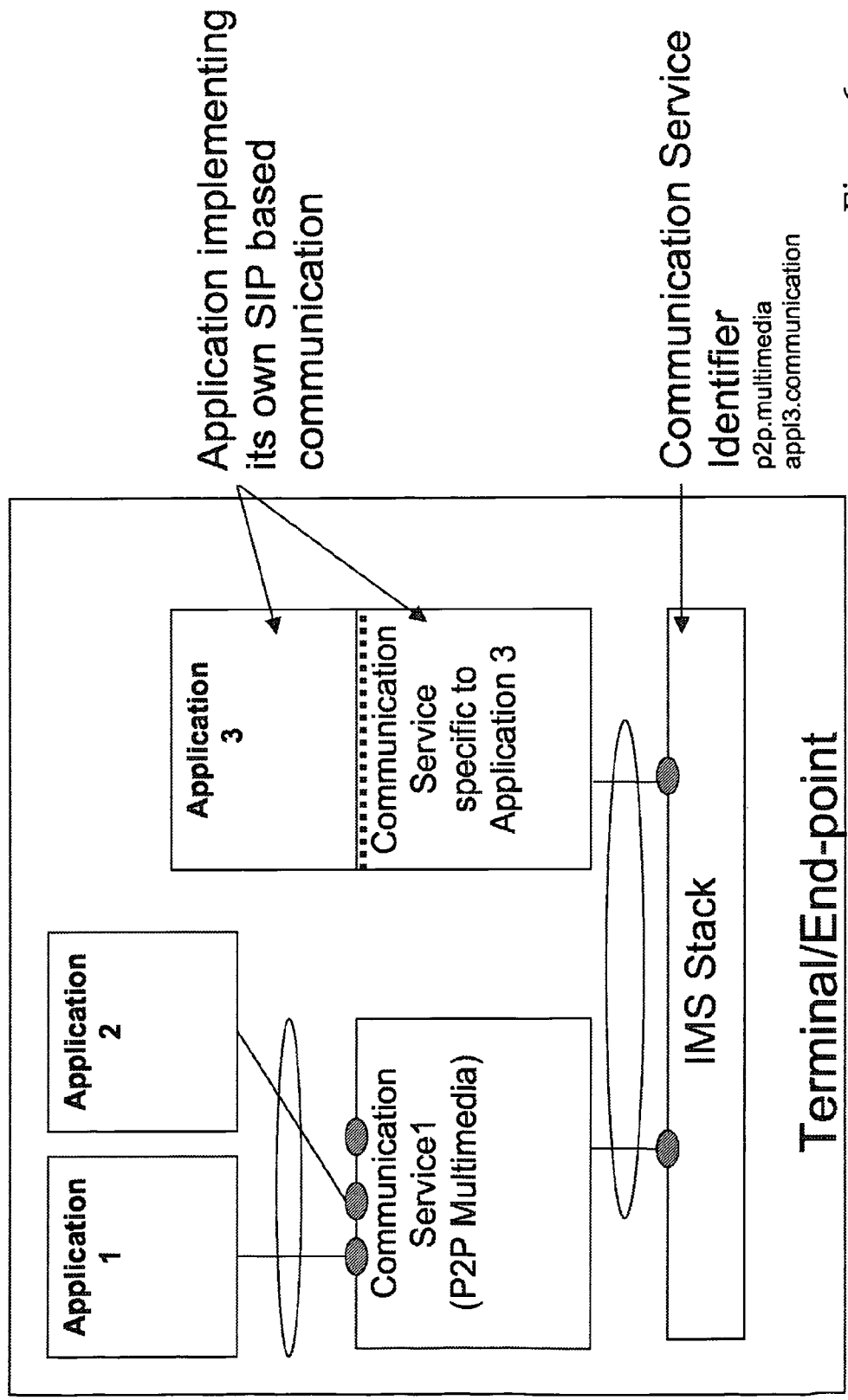
FIG. 6 illustrates schematically a terminal architecture in which one application implements a SIP based communication that is proprietary to the application.

It would be helpful to be able to specify in a SIP message the application that is to be used to handle a particular communication service, by way of an "Application Reference". This is useful when an IMS communication service allows applications to communicate according to the rules, procedures and associated media defined for the communication service. An application that uses an IMS communication service does not implement the SIP communication part of the service, but uses (i.e. "piggybacks on") the communication service for this purpose via an internal interface. The application reference identifies the application sitting on top of a communication service. Note also that it is possible for an application to implement a SIP based communication that is proprietary to the application, and the application would in such a case be identified with a communication service identifier. This is illustrated in FIG. 6.

The Application Reference can be implemented as a Feature Tag or as an "a-line" augmenting an m-line in the SDP part of a SIP message. Both have their advantages and disadvantages Application Reference as a Feature Tag Including the Application Reference as a Feature Tag has the advantage that the mechanism can be used for all SIP Messages (i.e. not only those carrying an SDP). This mechanism also indicates to a recipient end-point, which application shall be used for the communication service to be established. This application will be the "master" application for the session and will govern the addition of media to it. However, the mechanism can only be used at session establishment and is not suitable for indicating "sub-functionality" during an established session, e.g. to clarify that a medium in a Re-invite shall be used for a certain functionality. For example, using the Feature Tag approach by itself will not allow an expression that Message Session Relay Protocol (MSRP) shall be used for "Whiteboarding" and not "PictureViewer".

Application Reference as an A-Line Augmenting an M-Line in SDP

This mechanism has the advantage that it can be used to address "sub functionality" in an established SIP session. The recipient application is expressed in an a-line that follows the m-line indicating the initial media to be used. However, the mechanism can only be used for SIP messages that carry an SDP body (e.g. not for SIP Message).

By combining these two approaches together, the disadvantages can be avoided. It is therefore proposed to allow the Application Reference to be transferred both as a Feature Tag and in the SDP body. The Feature Tag is used to indicate the "Master Application" for the session. For standardized Communication Services this is the "default application" and its value could be set to the same value as the Communication Service Identifier. For example:
"Communication Service Identifier=P2P Multimedia
Application Reference=P2P Multimedia"
Of course, it may be possible to omit the Application Reference when the application is the default application.

For operator or vendor specific applications that use standardized Communication Services, the Application Reference contains the name of this application. For example:
"Communication Service Identifier=P2P Multimedia
Application Reference=OperatorOfficeHelper"
The Feature Tag is always used to address a recipient application when the SIP message type does not carry an SDP body (e.g. SIP Message).

An a-line in the SDP body is used to augment an m-line to clarify the context for which the m-line is used, when the SIP message type carries an SDP body (e.g. Invite).

FIG. 7 illustrates the SIP REGISTER message structure, where the Feature Tags identifying the communication services supported by the sending UE are identified in the Contacts header. FIG. 8 illustrates the SIP INVITE message structure for initiating a session between an initiating UE and a UE identified by the SIP URI SIP-URI1@operator.com. The Communication Service identifier ("+gp2p.multimedia") is included as one Feature Tag, whilst the Application Reference ("+gcommunication service") is included as a second Feature Tag to identify the mast application. An a-line is included to identify a further application ("3gpp.VideoSharing") which may be linked in to the same session by the master application.

There exists a need to be able to identify within the IMS and at UEs, simultaneous communication services (both IMS services and other services such as circuit switched (CS) speech) that are associated with an application. An identifier referred to here as "MCS-qualifier", provides an application with the ability to correlate several simultaneous IMS communication service sessions (e.g. P2P Multimedia and IMS Messaging), and to correlate IMS communication services with other non-IMS service sessions, e.g. CS-Speech.

The MCS-Qualifier can be used for example to determine the tariff to be applied to a session. In one example, CS-Speech may be combined with the IMS P2P multimedia service for videosharing implemented in a combinational service (CSI) fashion. The existence of the MCS-Qualifier allows the network to determine this and to apply different charging rules and rates to the IMS communication part for video transfer, charging rules and rates which differ from those that are applied when video is transferred over IMS in "a non-CSI context", i.e. IMS in a standalone context.

Figure 9:
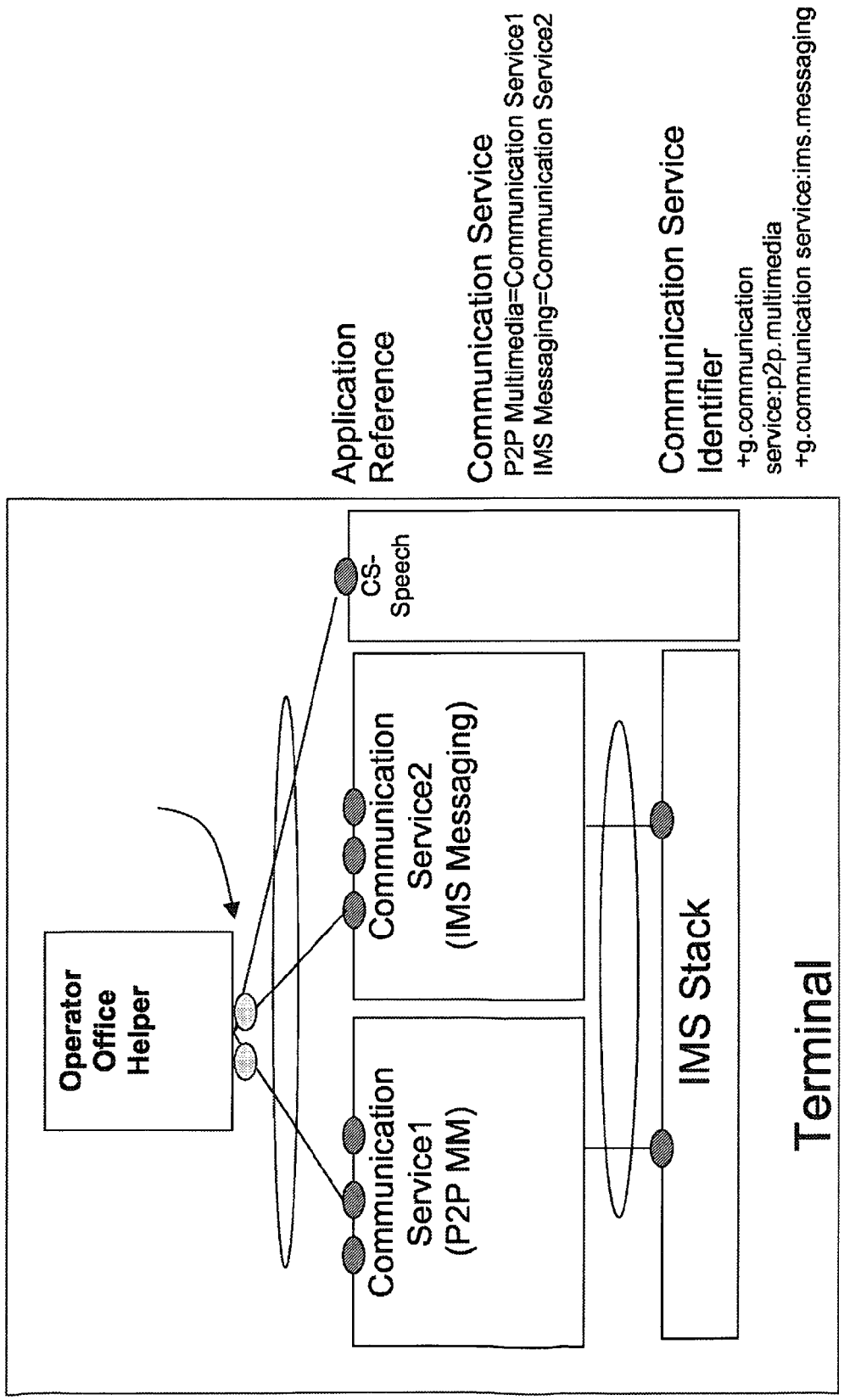
FIG. 9 illustrates schematically a UE architecture that makes use of Communication Service Identifiers, Application References, and Multiple Communication Service Qualifiers.

FIG. 9 illustrates an example where a particular application, in this case a network operator specific help application "OperatorOfficeHelper", uses the IMS communication service p2p multimedia, and the CS-Speech service. In order to have a meaningful communication, OperatorOfficeHelper must be installed on the terminals involved in the communication. Application Reference is set to "OperatorOfficeHelper" and encoded with a Feature Tag. The Communication Service Identifier is set to p2p multimedia, and the MCS-qualifier is set to IMS p2p multimedia and CS-Speech. An example of this SIP INVITE structure incorporating the Multiple Communication Services Identifier is shown in FIG. 10.

FIG. 11 shows an example of the SIP Message structure which might be sent in combination with the CS-Speech and p2p multimedia services. It is assumed in this example that the SIP Message is sent with the IMS Messaging Communication Service. The SIP Message carries the following parameters:

Communication Service Id=IMS Messaging
Application Reference=OperatorOfficeHelper
MCS-Qualifiers, CS-Speech, P2P Multimedia, IMS Messaging It will be appreciated by the person of skill in the art that various modifications may be made to the above described embodiments without departing from the scope of the present invention. For example, other mechanisms could be used to express Communication Service Identifiers, Application references and MCS-Qualifiers in SIP messages. In particular, it is possible to define new SIP Information Elements (Headers/Parameters) for this purpose.

The invention claimed is:

1. A method of operating a user terminal or IP Multimedia Subsystem (IMS) network node, said method comprising the steps of:
identifying at an IMS protocol stack in the user terminal or IMS network node, a communication service corresponding to a communication service identifier contained in a received Session Initiation Protocol (SIP) message, wherein the communication service identifier is included in the SIP message as a feature tag in the SIP message header;
forwarding the SIP message to the identified communication service;
receiving the SIP message at the identified communication service;
identifying at the identified communication service, an application corresponding to an application reference contained in the SIP message, wherein the application reference is included in the SIP message as a feature tag in the SIP message header and as an "a-line" augmenting an "m-line" in the Session Description Protocol (SDP) part of the SIP message; and
forwarding the SIP message to the identified application;
wherein the communication service identifier and the application reference separately identify the communication service and the application so that when multiple applications utilize a single communication service, the user terminal or IMS network node can properly route SIP messages to the identified communication service and the identified application.

2. A method of indicating an Internet Protocol Multimedia Subsystem (IMS) communication service and associated terminal application to which a Session Initiation Protocol (SIP) message relates, the method comprising the steps of:
including a communication service identifier in the SIP message, the communication service identifier identifying one of a plurality of IMS communication services; and
including an application reference in the SIP message, the application reference identifying the associated terminal application to be used for handling the identified IMS communication service, wherein the associated terminal application is identified from a plurality of terminal applications that are suitable for handling the identified IMS communication service;
wherein the communication service identifier and the application reference separately identify the communication service and the terminal application so that when multiple applications utilize a single communication service, a terminal can properly route SIP messages to the identified communication service and the identified terminal application.

3. The method as recited in claim 2, wherein a first application reference is included in the SIP message as a Feature Tag, and a second application reference is included in the SIP message as an a-line augmenting an "m-line" in a Session Description Protocol (SDP) part of the SIP message.

4. The method as recited in claim 3, wherein the first application reference identifies a master application, and the second application reference identifies an ancillary application.

5. The method as recited in claim 2, wherein the communication service identifier is included in the SIP message as a Feature Tag.

6. The method as recited in claim 5, wherein the Feature Tag is included in one of a Contact, Accept-Contact, or Reject-Contact header of the SIP message.

7. The method as recited in claim 2, wherein the application reference is included in the SIP message as a Feature Tag.

8. The method as recited in claim 7, wherein the Feature Tag is included in one of a Contact, Accept-Contact, or Reject-Contact header of the SIP message.

9. A method of operating a user terminal or Internet Protocol Multimedia Subsystem (IMS) network node, the method comprising the steps of:

receiving a Session Initiation Protocol (SIP) message as part of a first communication service session, the SIP message including a communication service identifier, an application reference, and a Multiple Communication Service (MCS) qualifier;

utilizing the communication service identifier to identify at an IMS protocol stack, an appropriate communication service;

utilizing the application reference by the identified communication service to identify an associated application for handling the identified communication service, wherein the communication service identifier and the application reference separately identify the communication service and the associated application so that when multiple applications utilize a single communication service, the user terminal or IMS network node can properly route SIP messages to the identified communication service and the associated application; and utilizing the MCS qualifier to correlate the first communication service session with at least one other simultaneous communication service session.

* * * * *